(12) United States Patent
Parsons

(10) Patent No.: US 6,446,664 B1
(45) Date of Patent: Sep. 10, 2002

(54) EROSION RESISTANT WEAR SLEEVE FOR HIGH PRESSURE VALVES

(75) Inventor: Michael E. Parsons, Cypress, TX (US)

(73) Assignee: Power Chokes, Inc., Cypress, TX (US)

( * ) Notice: Subject to any disclaimer, the term of this patent is extended or adjusted under 35 U.S.C. 154(b) by 0 days.

(21) Appl. No.: 09/661,526

(22) Filed: Sep. 13, 2000

Related U.S. Application Data

(60) Provisional application No. 60/155,128, filed on Sep. 22, 1999.

(51) Int. Cl.[7] ............................ F16K 43/00; F16K 51/00
(52) U.S. Cl. .................. 137/375; 137/315.02; 137/329; 251/124; 166/91.1; 138/45
(58) Field of Search ............................ 137/375, 315.02, 137/329; 251/118, 124, 122; 138/45; 166/91.1

(56) References Cited

U.S. PATENT DOCUMENTS

| | | | | |
|---|---|---|---|---|
| 1,698,826 A | * | 1/1929 | Shaffer | 251/122 |
| 4,128,109 A | * | 12/1978 | Chervenak et al. | 251/118 |
| 4,281,678 A | * | 8/1981 | Claycomb | 251/333 |
| 4,337,788 A | | 7/1982 | Seger | 251/122 |
| 5,065,787 A | * | 11/1991 | Lochmann | 166/91.1 |

* cited by examiner

*Primary Examiner*—A. Michael Chambers
(74) *Attorney, Agent, or Firm*—Elizabeth R. Hall

(57) ABSTRACT

A throttling choke valve having a wear sleeve lining the interior surface of the cylindrical passage downstream of the valve sealing mechanism. A preferred embodiment of the wear sleeve has a removable retainer ring that fits between the wear sleeve and the fluid outlet. The retainer ring has a distal end that opens into the pipeline. At the distal end of the retainer ring the thickness of the wall of the retainer is decreased such that the interior surface is curved outward toward the interior surface of the pipeline.

7 Claims, 4 Drawing Sheets

US 6,446,664 B1

EROSION RESISTANT WEAR SLEEVE FOR HIGH PRESSURE VALVES

CROSS-REFERENCE TO PROVISIONAL APPLICATION

The present application claims the benefit of U.S. Provisional Application No. 60/155,128 filed Sep. 22, 1999 and entitled Erosion Resistant Wear Sleeve for High Pressure Valves.

FIELD OF THE INVENTION

The present invention relates generally to an erosion resistant wear sleeve at the fluid outlet of a pressure valve. More particularly, to a wear sleeve having a diverging fluid outlet end for transitioning from the smaller choke passage to the larger line bore.

BACKGROUND OF THE INVENTION

High-pressure valves for controlling flow of drilling fluids are important devices in the exploration and production of oil and gas. In the trade such valves are commonly referred to as choke valves.

A choke valve is exposed to erosive and corrosive drilling fluids for extended periods of time. Drilling fluids are designed to carry the debris from the drill bit to the surface and often are quite viscous and particle-laden. The choke valve is subjected to high flow velocities of these dense, particle-laden fluids creating an extremely erosive environment.

When a pay-zone is reached, pressures immediately increase, forcing the drilling fluids to the surface in the return line. Generally when this occurs, the blowout preventers are closed and the pressure is controlled through the choke valves. When the choke valve is closed, it should seat tightly so that no leakage occurs. For this reason erosion of the valve seat and/or the gate can be a severe problem.

However, deterioration of any component within the choke valve is a problem that requires the system to be shut down and the eroded component to be replaced. Another component of the choke valve that experiences rapid erosion is the extreme end of the fluid outlet where the choke valve joins the pipeline. The accelerated erosion of the fluid outlet end is associated with a flow discontinuity caused by the abrupt transition from the smaller choke passage to the larger line bore. A need exists for a mechanism for minimizing this erosion to prolong the useful life of the choke valve.

SUMMARY OF THE INVENTION

The present invention provides a wear sleeve and a replaceable retainer ring, wherein the outlet end of the retainer ring is altered to decrease the abruptness of the transition from the smaller choke passage to the larger line bore. The outlet end may be tapered, curved or otherwise shaped so that the internal diameter of the retainer ring increases at its outlet end.

The foregoing has outlined rather broadly several aspects of the present invention in order that the detailed description of the invention that follows may be better understood. Additional features and advantages of the invention will be described hereinafter which form the subject of the claims of the invention.

It should be appreciated by those skilled in the art that the conception and the specific embodiment disclosed may be readily utilized as a basis for modifying or designing other tools for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Numerous objects, features and advantages of the present invention will be readily apparent to those of ordinary skill in the art upon reading the following disclosure in conjunction with the accompanying drawings, in which.

DETAILED DESCRIPTION OF THE PREFERRED EMBODIMENT

The present invention relates to an erosion resistant wear sleeve at the fluid outlet of a choke valve.

Figure 1:
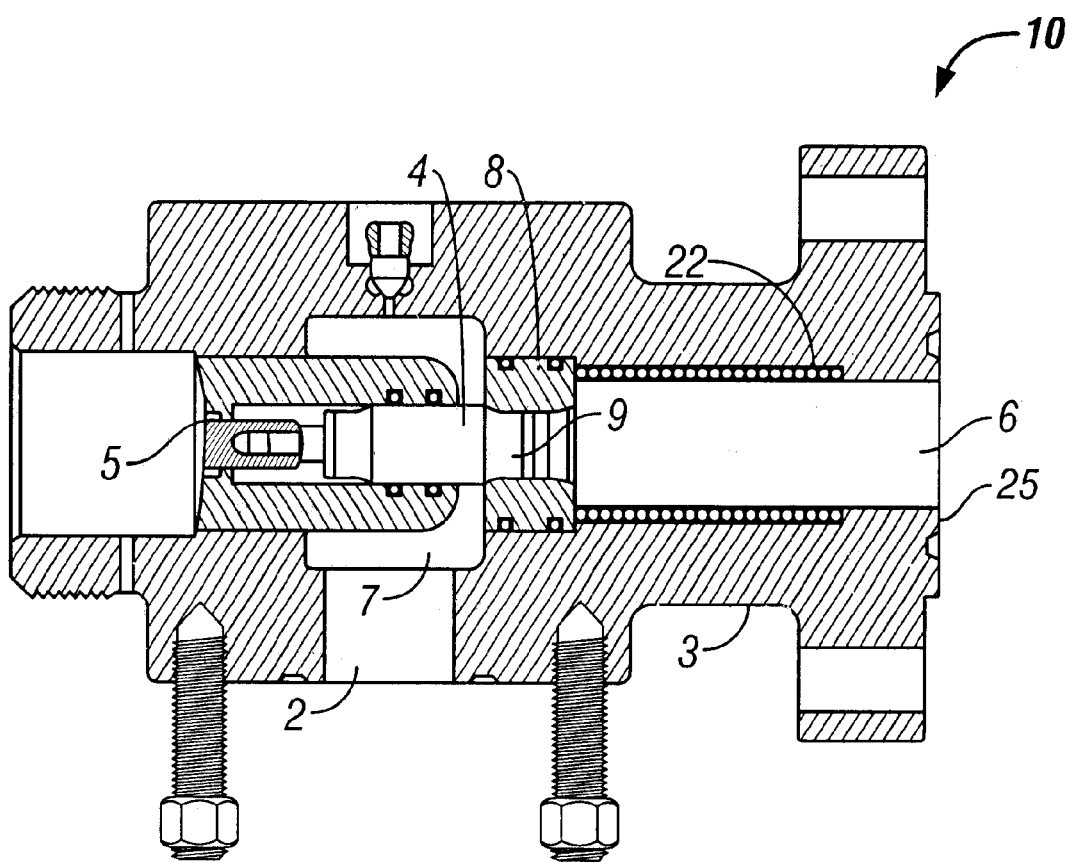
FIG. 1 is a longitudinal, cross-sectional view of a choke valve.

Referring now in detail to the drawings wherein like numerals refer to like parts throughout the various views. FIG. 1 depicts a choke valve. The valve body 3 has an inlet passage 2 on one side and an outlet passage 6 at an outlet end 25 of the choke valve. Thus, fluids flowing through the choke valve make a right angle turn between the inlet 2 and outlet 6. The outlet end 25 is removably connected to a pipeline system when the choke valve is in use.

A seat 8 slides into the valve body 3. The seat 8 has an annulus in alignment with the outlet passage 6. Seat 8 is positioned at the throat of the fluid passage close to where the fluid makes a right angle turn to proceed through the outlet passage 6. One end of seat 8 rests on a shoulder 7 facing upstream in the valve body. Wear sleeve 22 is downstream of the seat 8 and lines the fluid passage of the valve body 3 to prevent erosion of the valve body.

A longitudinally movable valve stem 5 is aligned with the outlet passage 6 and connected to a gate 4. The gate 4 is typically made of a tungsten carbide. Gate 4 is a cylinder having a plug end 9. The plug end 9 is designed such that when it is biased against the seat 8 it will seal the annulus of the seat 8 and prevent the flow of fluid through the choke valve. When the valve is opened by retracting the stem 5, the plug end 9 disengages from the seat 8 allowing fluid to flow through the seat annulus, through the wear sleeve 22 and outlet passage 6 into the pipeline.

One problem with currently available choke valves is the accelerated erosion of the wear sleeve at the extreme end of the fluid outlet. The replacement of eroded wear sleeves requires downtime for the choke valve and qualified personnel to perform the replacement. One attempted solution to this problem can be seen in the wear sleeve 22 and retainer ring 23 incorporated into the choke valves sold by Power Chokes, Inc. of Cypress, Tex. as illustrated in FIG. 2.

Since the accelerated erosion of the wear sleeve occurs at the fluid outlet end 25, a threaded retainer ring 23 has been inserted at the outlet end 25 of the choke valve. Whenever the retainer ring 23 is eroded the retainer ring can be easily unscrewed and a new retainer ring 23 installed without having to break down the valve body 3 to gain access to the interior fluid passageway. This modification of the typical wear sleeve has diminished the costs associated with the replacement of eroded wear sleeves, but it has not decreased the erosion of the wear sleeve.

Figure 2:
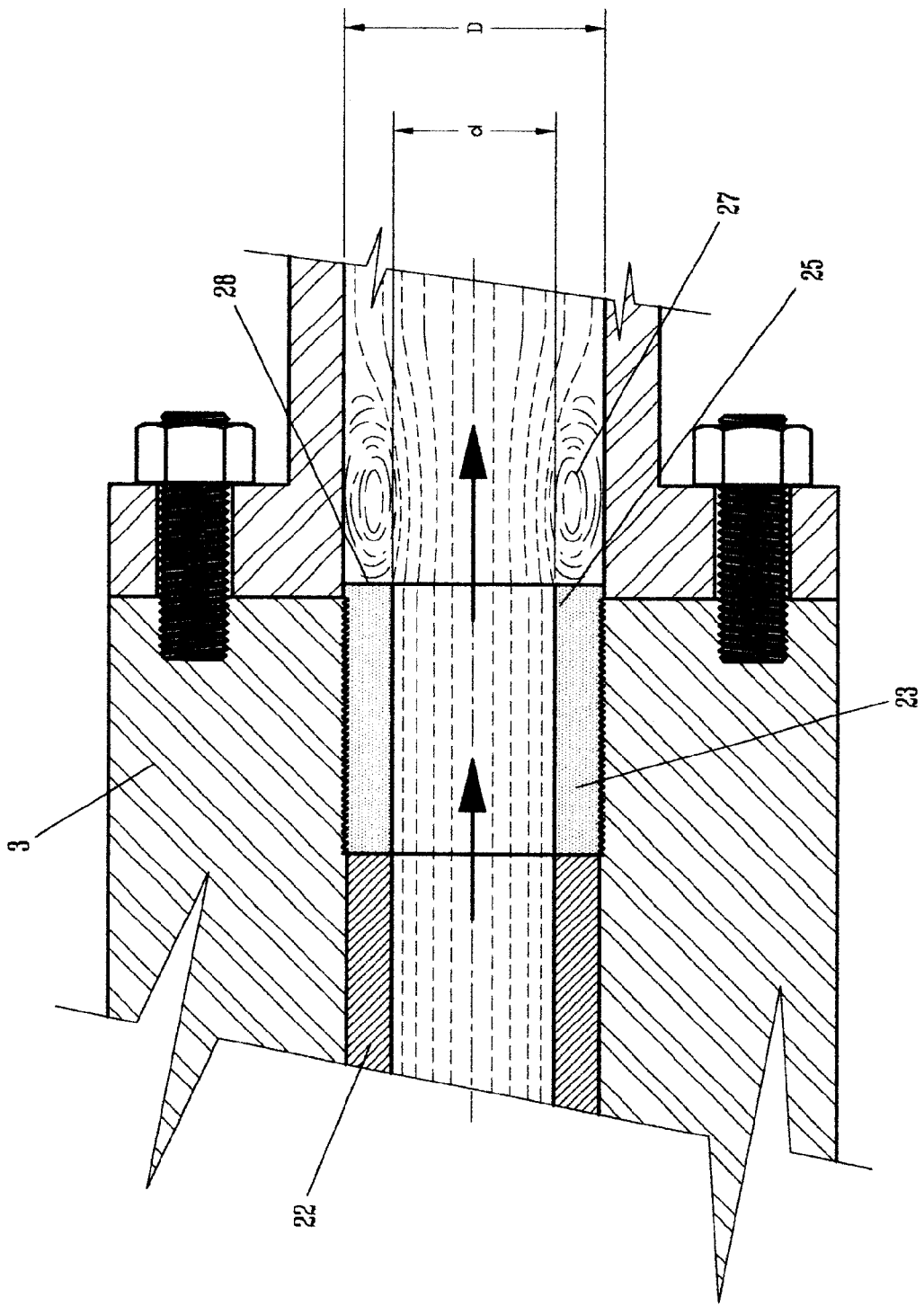
FIG. 2 is a longitudinal, cross-sectional view of the prior art wear sleeve outlet.

The internal diameter of the wear sleeve 22 and the upstream portion of the retainer ring 23 is substantially equal and is identified as d in FIG. 2. The internal diameter of the pipeline, identified as D in FIG. 2, is larger than d. It is customary in the trade for D to be larger than d is order to decelerate the flow as it enters the pipeline. It is believed that the accelerated erosion of the fluid outlet end 25 is associated with a flow discontinuity due to the abrupt transition from the smaller choke passage to the larger line bore.

In as much as choke valves control the flow of wellbore fluids and these fluids entrain particles of abrasive matter carried up from the formation, high velocities are attained by fluids and particles alike when the choke valve throttles the flow. Erosive damage results when these high velocity particles expend their kinetic energy impacting against choke component surfaces.

The erosion of the outlet face 28 is accelerated due to the fluid stream separating from the wall of the conduit allowing a stall 27 to form in the void thus created. The stall 27 consists of a turbulent mass of fluid rotating in place with a counterflow component against the conduit wall. This counterflow impinges against the outlet face 28 thus eroding it.

Figure 3:
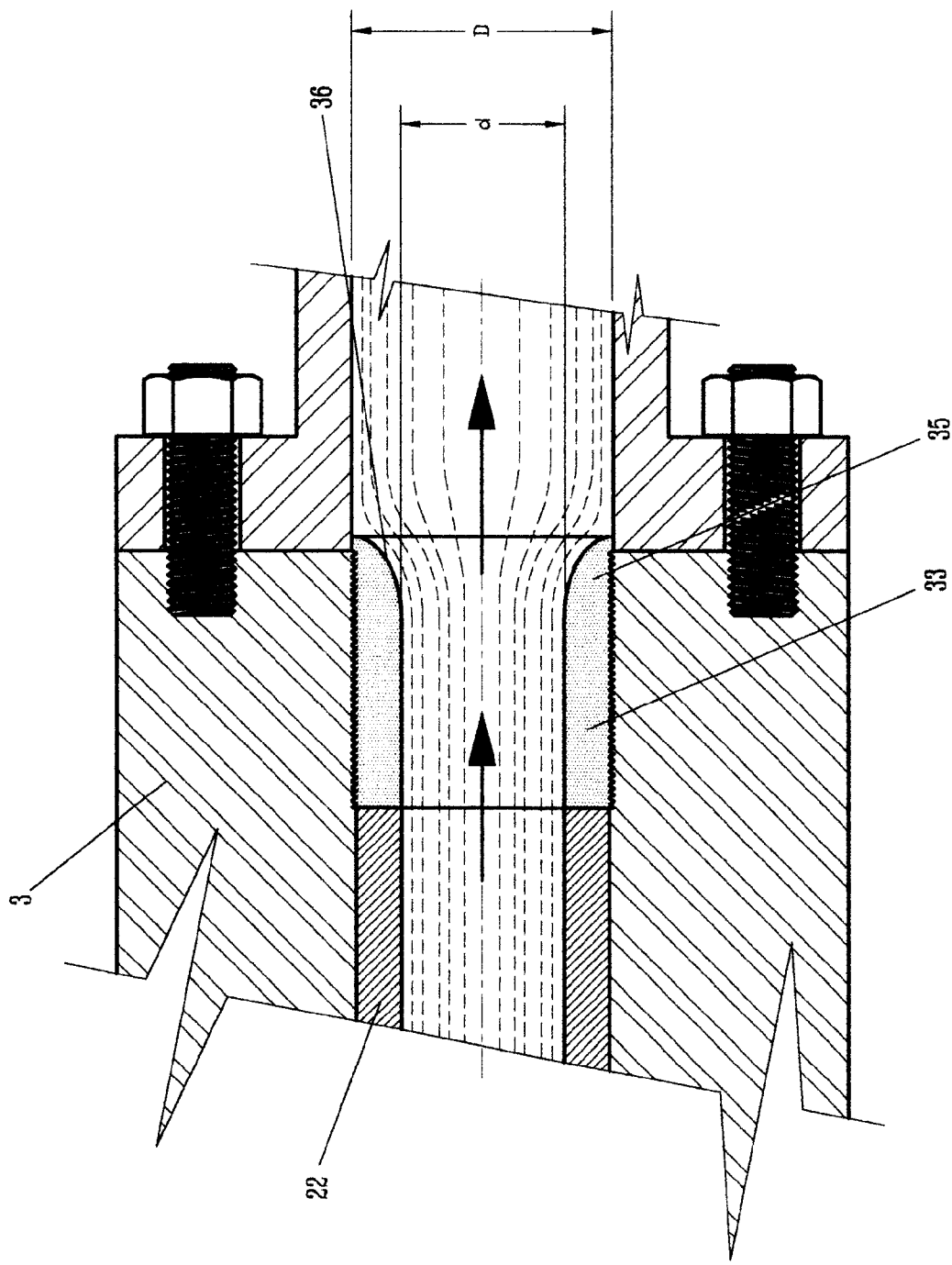
FIG. 3 is a longitudinal, cross-sectional view of one embodiment of a wear sleeve constructed according to the principles of this invention.

A preferred solution to this problem is illustrated in FIG. 3. The outlet end of the retainer ring 33 is altered to decrease the abruptness of the transition from the smaller choke passage to the larger line bore. The outlet end may be tapered, curved or otherwise shaped so that the internal diameter of the retainer ring 33 increases at its outlet end 35. A preferred embodiment has a curved outlet face 36. Thus, the retainer ring 33 has a cylindrical inside diameter up to the outlet end, which is profiled in the shape of an elliptical quadrant. This elliptical quadrant profile acts as a diffuser to decelerate the fluid leaving the choke valve and to minimize the turbulence and separation. Reducing the separation and stall at the outlet end 35 reduces the erosion of the outlet face 36.

Figure 4:
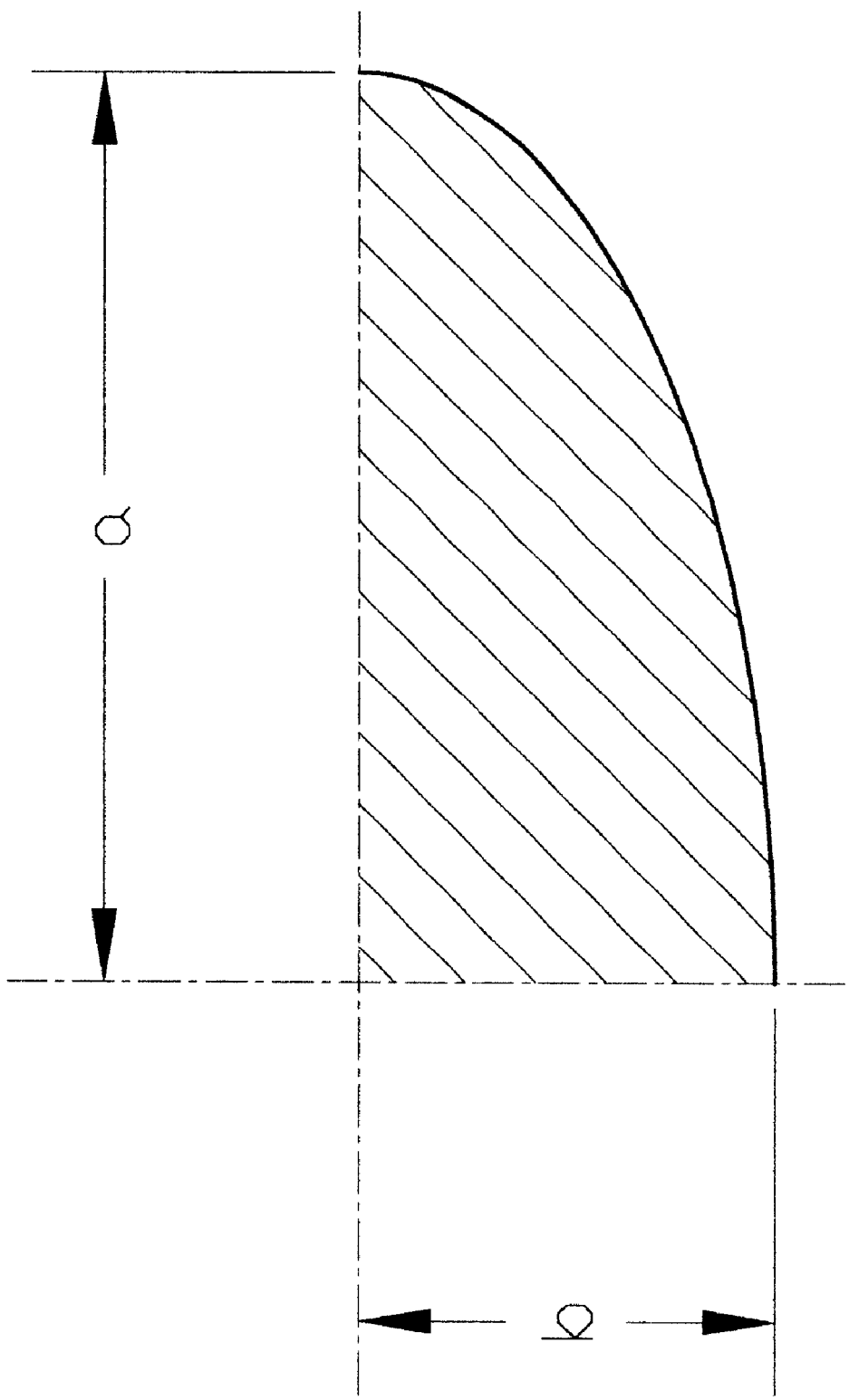
FIG. 4 is schematic representation of a preferred profile for the outlet end of the wear sleeve.

A preferred shape of the outlet face 36 can be calculated based on the dimensions of d and D. FIG. 4 illustrates a preferred profile of the outlet face 36. This shape has a length of curvature of a and a height of curvature of b, where:

$$a = \frac{1}{2} \times D$$

$$b = \frac{1}{2} \times (D-d).$$

In addition, constructing the retainer ring 33 with both an optimum profile of the outlet end 36 and an erosion resistant material provides an erosion resistance that is beyond the effect of each component or the arithmetic sum of their resistant effects.

While the present invention and its advantages have been disclosed and discussed in connection with the choke valve, it should be appreciated by those skilled in the art that the specific embodiments disclosed may be readily utilized as a basis for modifying or designing other wear sleeves for carrying out the same purpose as the present invention. It should also be recognized by those skilled in the art that such equivalent constructions do not depart from the spirit and scope of the invention as set forth in the appended claims.

What is claimed is:

1. A high pressure choke valve comprising:
    a valve body having a side inlet passage and an end outlet passage;
    a seat mounted in the valve body between the inlet and outlet passages, the seat being reversibly plugged with a plug end of a gate;
    a wear sleeve mounted in the valve body downstream from the seat;
    a retainer ring reversibly mounted in the valve body having a one end adjacent to the wear sleeve and a second end terminating at the outlet passage, wherein the retainer ring has a cylindrical inside diameter except at the second end, said second end diverges toward the outlet passage wherein the second end is curved outward and has an elliptical quadrant profile.

2. The high pressure valve of claim 1 where the second end has a length of curvature about ½ an internal diameter of an adjacent pipeline and a height of curvature about ½ the difference in the internal diameter of the adjacent pipeline and an internal diameter of the wear sleeve.

3. The high pressure valve of claim 1 made of an erosion resistant material.

4. The high pressure valve of claim 1 wherein the retainer ring has a threaded outside surface, said threaded surface engaging a threaded segment of the valve body downstream of the wear sleeve.

5. A high pressure choke valve retainer ring having an inlet end, an outlet end and an internal diameter, said retainer ring reversibly mounted in a high pressure choke valve body downstream of a wear sleeve with said inlet end adjacent to the wear sleeve and said outlet end adjacent to an outlet passage of said valve body where said outlet passage is attached to a pipeline, said pipeline having a greater internal diameter than the internal diameter of the retainer ring wherein said outlet end is configured as an elliptical quadrant.

6. The retainer ring of claim 5, wherein the outlet end has a length of curvature about ½ the internal diameter of the pipeline and a height of curvature about ½ the difference in the internal diameter of the pipeline and the internal diameter of the wear sleeve.

7. A high pressure choke valve comprising:
    a valve body having a side inlet passage and an end outlet passage;
    a seat mounted in the valve body between the inlet and outlet passages, the seat being reversibly plugged with a plug end of a gate;
    a wear sleeve mounted in the valve body downstream from the seat;
    a retainer ring reversibly mounted in the valve body having a one end adjacent to the wear sleeve and a second end terminating at the outlet passage, wherein the retainer ring has a cylindrical inside diameter except at the second end, said second end diverges toward the outlet passage wherein the second end is curved outward and has an elliptical quadrant profile and has a length of curvature about ½ the internal diameter of the pipeline and a height of curvature about ½ the difference in the internal diameter of the pipeline and the internal diameter of the wear sleeve.

* * * * *